United States Patent [19]

Takizawa et al.

[11] 4,373,747
[45] Feb. 15, 1983

[54] PASSIVE SAFETY BELT DEVICE

[75] Inventors: Junichi Takizawa, Isesaki; Nobuo Satoh, Ohta, both of Japan

[73] Assignee: Fuji Jukogyo Kabushiki Kaisha, Tokyo, Japan

[21] Appl. No.: 158,178

[22] Filed: Jun. 10, 1980

[30] Foreign Application Priority Data

Jul. 17, 1979 [JP] Japan .................. 54-98656[U]

[51] Int. Cl.³ ............................................. B60R 21/10
[52] U.S. Cl. ...................................................... 280/802
[58] Field of Search ............... 280/802, 803, 804, 808, 280/751

[56] References Cited

U.S. PATENT DOCUMENTS

| | | | |
|---|---|---|---|
| 4,061,365 | 12/1977 | Nagano | 280/751 |
| 4,084,841 | 4/1978 | Hayashi | 280/802 |
| 4,213,637 | 7/1980 | Mauron | 280/802 |

Primary Examiner—Robert R. Song
Attorney, Agent, or Firm—Martin A. Farber

[57] ABSTRACT

A passive safety belt device for a vehicle comprising a safety belt connected between the door of the vehicle and a retractor provided on the floor of the vehicle at a central portion and a belt guiding member pivotally mounted at a central portion. The belt guiding member is rotatable between a backward fastening position near the passenger's waist and a forward releasing position away from the waist. The belt guiding member is connected to the door by a cable and is biased in the backward direction by a spring. The cable passes through a knee pad provided under an instrument panel and projects from an end portion of said knee pad adjacent to an inner panel of said door and being connected to the inner panel at an outer end of the cable. Thus, when the door is opened, the belt guiding member is moved to the forward releasing position so that the safety belt may be removed from the passenger's waist.

5 Claims, 3 Drawing Figures

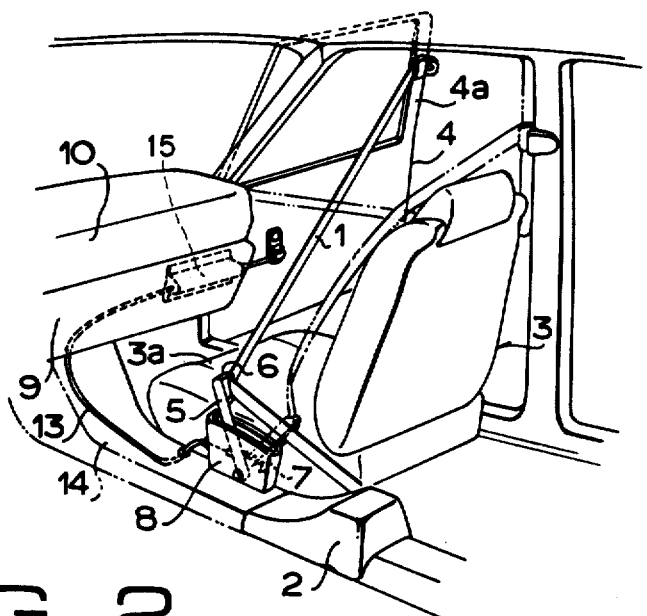
FIG. 1.
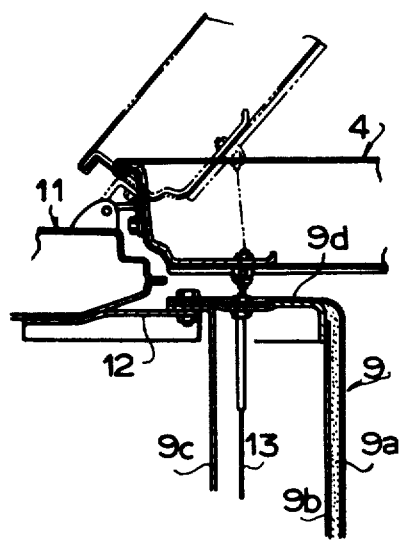
FIG. 2.
FIG. 3.

PASSIVE SAFETY BELT DEVICE

BACKGROUND OF THE INVENTION

The present invention relates to a passive safety belt device which may be automatically fastened and released for protecting a passenger seated in a vehicle, such as an automobile, from injury.

In general use is a passive safety belt device in which a safety belt is connected between a retractor provided on a floor of a central portion of the vehicle and a rear portion of the door and which is automatically fitted to the passenger's body by closing the door of the vehicle, and automatically removed from the passenger's body by opening the door.

Such a passive safety belt device has advantages that no driving means such as a motor for fastening and releasing of the belt and no guiding means for the belt are required. However, the device has an undesirable operation causing the belt to rub against a side of the passenger's waist at the retractor side during an early period in the releasing operation and a late period in the fastening operation. This causes unpleasant feelings. Further, the belt may pull a part of the passenger's clothes, which causes an improper fastening condition.

SUMMARY OF THE INVENTION

The present invention seeks to provide a passive safety belt which eliminates the above described disadvantages and is improved compared to other known passive safety belt devices. According to the present invention, there is provided a safety belt device for a vehicle comprising a retractor provided in a lower portion of a central portion of the vehicle, a safety belt connected between said retractor and the door of the vehicle at a rear portion thereof, a belt guiding member engaged with said safety belt, said belt guiding member being provided to be moved between a backward fastening position near the passenger's waist and a forward releasing position apart from the passenger's waist, and a cable connected between said belt guiding member and said door, said cable passing through a knee pad provided under an instrument panel of the vehicle and projecting from an end portion of said knee pad adjacent to an inner panel of said door and being connected to the inner panel at an outer end of the cable.

The present invention will be fully described with reference to the accompanying drawings.

BRIEF DESCRIPTION OF THE DRAWINGS

FIG. 1 is a perspective view showing an embodiment in an automobile according to the present invention, FIG. 2 is a sectional plan view showing an end portion of a knee pad, and FIG. 3 is a sectional side view of the knee pad.

DESCRIPTION OF THE PREFERRED EMBODIMENT

Referring to FIG. 1, a safety belt 1 is provided with one end connected to a body member, (such as a floor or a member secured to the floor) through a retractor 2 provided on a portion between seats 3, and the other outer end of the belt passes over the seat 3 and is connected to a sash 4a of a door 4 at an upper rear portion of the door. The safety belt is so arranged that, when the door 4 is closed, the safety belt extends diagonally across the passenger from the shoulder to the hip to restrain the passenger's body.

In the case of a sash-less door, the outer end of the safety belt is connected to a belt supporting member (not shown) projecting on a rear portion of the door. A belt guiding member 5 is rotatably supported in a bracket 8 secured to a seat cushion 3a of the seat 3 and is biased by a spring 7 in the backward direction. A guide ring 6 which is engaged with the safety belt slidable relative thereto is attached to the belt guiding member 5. The guiding member is so arranged that the guide ring 6 is positioned at a backward portion in the fastening condition as shown by dash-dotted lines in FIG. 1 and positioned at a forward portion in the releasing condition.

The belt guiding member 5 is connected to the door 4 through a cable 13. The cable 13 passes through a console box 14, a knee pad 9 and an end portion 9d of the knee pad adjacent the inner panel of the door, and the end of the cable is fixed to the inner panel of the door 4. The knee pad 9 is provided under an instrument panel 10 and comprises an outer panel 9b, inner panel 9c, and cushion 9a provided on the outer panel 9b. The end portion 9d is secured to a body portion 11 such as a front pillar through a bracket 12. The cushion 9a is positioned in front of the passenger's knee for preventing the passenger from striking the panel. Since the end portion 9d of the knee pad is adjacent to the inner panel of the door 4, the cable 13 may be connected to the inner panel of the door projecting from the end portion 9d of the knee pad passing through the knee pad 9 at a proper position whereby a stroke sufficient to rotate the belt guiding member 5 may be obtained. A horizontal guide member 15 shown in dashed lines is provided near the end portion 9d of the knee pad. The cable 13 is horizontally guided for displacement in this guide member adjacent the connection of the outer end of the cable 13 to the inner panel of the door.

In the closed position of the door, the belt guiding member 5 is positioned in the backward position shown by the dotted lines in FIG. 1, so that the safety belt may be extended diagonally across the passenger's body. When the door is opened, the safety belt is pulled from the retractor 2 and the belt guiding member 5 is rotated forwardly by the cable 13 against the spring 7. Thus, the safety belt is moved in forward direction, so that the safety belt may be pulled without rubbing against the passenger's waist. In addition, since the safety belt is located in a forward portion, a large space for getting in and out of the vehicle may be formed.

When the door is closed after sitting, the safety belt is wound in the retractor 2 without rubbing against the passenger's waist and is fastened in a proper position with the aid of the belt guiding member 5.

In accordance with the present invention, since the cable for actuating the belt guiding member passes through the knee pad the end portion of which is positioned in a forward portion of the inside of the door, the cable may be extended without exposing in the passenger's space and not interfering with the passenger's feet and the end of the cable may be connected to the door at such a position that a stroke sufficient to actuate the belt guiding member may be obtained.

What is claimed is:

1. A passive safety belt device for a vehicle having a door with an inner panel and a knee pad under an instrument panel on a dash-board comprising a retractor provided in a lower portion of a central portion of the vehicle, a safety belt connected between said retractor and the door of the vehicle at a rear portion thereof, a belt guiding member engaged with said safety belt, said belt guiding member being mounted moveable between a backward fastening position near an occupant's waist and a forward releasing position apart from the occupant's waist, and a non-sheathed cable connected between said belt guiding member and said door, said cable passing through said knee pad provided under the instrument panel of the vehicle and projecting from an end portion of said knee pad adjacent to said inner panel of said door and being connected to the inner panel at an outer end of the cable.

2. The passive safety belt device for a vehicle according to claim 1 wherein said belt guiding member is pivotally mounted on a central side of a seat of the vehicle, spring means for biasing said belt guiding member in a backward direction.

3. The passive safety belt device according to claim 1, further comprising a console box mounted on the floor of the vehicle, said console box extending between front seats of the vehicle directly up to the knee pad, said belt guiding member is disposed between said seats, said cable has an inner end portion having an inner end connected to said belt guiding member and extending immediately therefrom into said console box disposed and directly extending from said console box at a forward portion of the latter entering into said knee pad.

4. The passive safety belt device according to claim 1, further comprising a horizontal cable guide member disposed in said knee pad adjacent said end portion of said knee pad defines a horizontal channel, said cable displaceably extends through said horizontal channel of said cable guide member, connection means mounted on said inner panel of said door for connecting said outer end of said cable to said inner panel, said channel of said guide member is horizontally aligned with and substantially directed toward said connecting means.

5. The passive safety belt device according to claim 2, further comprising a bracket disposed adjacent the central side of the seat, said belt guiding member is pivotally mounted at a pivot point at a bottom of said bracket, said spring means is mounted between said belt guiding member and a rear end of said bracket, an inner end of said cable extends through a front end of said bracket and is connected to a bottom portion of said belt guiding member, said bracket defines an elongated opening extending in the lengthwise direction of the vehicle and opening upwardly, said belt guiding member has an upper portion extending upwardly out of said opening and formed with a guide ring facing the seat and defining a seat belt opening means for guiding said safety belt displaceably therein.

* * * * *